United States Patent [19]

Mäkinen

[11] 4,347,795
[45] Sep. 7, 1982

[54] SET OF SHELVES

[76] Inventor: Pekka Mäkinen, Kankaantaka, 37100 Nokia, Finland

[21] Appl. No.: 91,024

[22] Filed: Nov. 5, 1979

[30] Foreign Application Priority Data

Nov. 6, 1978 [FI] Finland ............................ 783374
Jul. 17, 1979 [FI] Finland ............................ 792230

[51] Int. Cl.³ .............................................. A47B 5/00
[52] U.S. Cl. ............................... 108/152; 108/134; 312/245
[58] Field of Search ............... 108/108, 109, 110, 152, 108/134; 312/245; 297/441

[56] References Cited

U.S. PATENT DOCUMENTS

| | | | |
|---|---|---|---|
| 2,016,194 | 10/1935 | Fredin | 108/152 X |
| 3,580,191 | 5/1971 | McDonnell | 108/152 |
| 3,669,034 | 1/1972 | Marschak | 108/152 |
| 4,239,280 | 12/1980 | Ackerman | 297/441 X |

FOREIGN PATENT DOCUMENTS

| | | | |
|---|---|---|---|
| 1294252 | 4/1962 | France | 108/152 |
| 2364635 | 4/1978 | France | 312/245 |
| 1444525 | 8/1976 | United Kingdom | 108/152 |

Primary Examiner—James T. McCall
Attorney, Agent, or Firm—Pollock, Vande Sande & Priddy

[57] ABSTRACT

An improved shelf assembly including at least one pair of shelf support devices each having a threaded end extending through separate openings formed in a rear plate and through separate openings formed in a pair of hanging devices positioned adjacent to said rear plate. Each shelf support device includes a cleft sufficient in size to receive an end portion of a shelf extending between the support devices. Nuts mounted on the threaded end portions lock the support devices, rear plate and hanging devices together, while plugs mounted on the opposite end of each support device lock the shelf in place.

11 Claims, 13 Drawing Figures

FIG. 12
FIG. 13
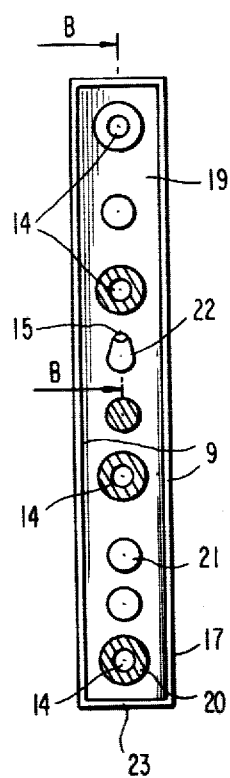
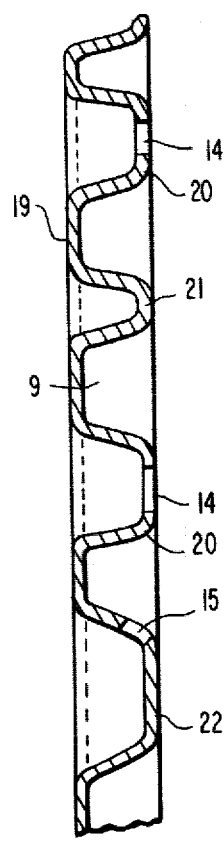

SET OF SHELVES

BACKGROUND OF THE INVENTION

This invention relates to a set of shelves, which is of the type made more closely defined in the specification following hereafter.

Various structures of collapsable sets of shelves are known. These structures are suitable for certain usage and the structure is simple. The set of shelves is easy to put together and also easy to take apart when so needed.

However for the present such a collapsable set of shelves hasn't been introduced in which the attachement of the shelves to a rear plate formed of a material such as glassplate or the like would have been solved so that the attachement is simple and simultanously firm and also easy and fast to do.

Furthermore such a structure hasn't been introduced for attaching the set of shelves to a wall so that the attaching or hanging device has been attached by means of the supports of the shelves or by means of other supporting structure behind the rearplate. Thus, the supporting structure simultaneously supports the rearplate, making it possible to use thinner mirror materials in forming the rear plate.

SUMMARY OF PRESENT INVENTION

The purpose of this invention is to bring about a new structure for a set of shelves, which structure eliminates the disadvantages of conventional structures. This is achieved by making a set of shelves, in which the shelves are attached to the rearplate in a new, simple and fast way. The attaching devices for this purpose are very simple. The invention makes it possible to make various structures of sets of shelves by using attaching devices according to the invention. This can be done without any special tools. The holes for attaching the shelves can be previously formed in the rearplate when in the factory. The shelves themselves don't need any kind of borings or cuts. The packing of the set of shelves with its installation parts takes only a small space.

Another purpose of this invention is to bring about a novel pair of hanging devices for a set of shelves, these hanging devices being attached behind the rearplate by means of the attaching devices for the shelves. The hanging device includes hanging support structure by means of which the set of shelves can be attached onto the wall. Thus the hanging of the set of shelves according to the invention is simple. Furthermore the rearplate formed of a material such as glassplate can be made of thinner material, because these hanging devices simultaneously support the rearplate.

The purposes of this invention are achieved in a set of shelves formed in accordance with the description following hereafter.

BRIEF DESCRIPTION OF THE DRAWINGS

Some suitable embodiments of the invention are made better perceptible in the following description with simultaneous references to the enclosed drawings, in which;

FIG. 12 shows the hanging device according to the invention in a front view; and FIG. 13 shows the same along the line B—B in FIG. 12.

DETAILED DESCRIPTION OF PREFERRED EMBODIMENTS

Figure 6:
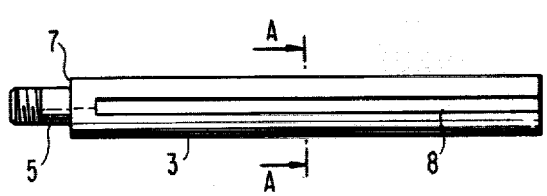
FIG. 6 shows the attaching and supporting socket for the shelf in a side view.
Figure 7:
FIG. 7 shows the same along the line A—A in FIG. 6.

The set of shelves according to the invention (FIG. 1) includes the rearplate 1, which is preferably made of some hard material especially glass or the like. The shelves 2 are according to the invention attached to the rearplate by means of socket-formed supports 3, which are fixed onto the plate transversally to its surface through the holes 4 of the plate. For the attachement the threaded tap 5 is arranged at the end of the support device 3. This tap 5 is inserted through the hole 4. The support device 3 has been cleaved in its longitudinal direction so that a longitudinal cleft 8 is accomplished (FIGS. 6 and 7). The length of the cleft 8 corresponds to the width of the shelf 2. The side-edge of the shelf is pushed into this cleft 8 when assembling the shelf.

Figure 1:
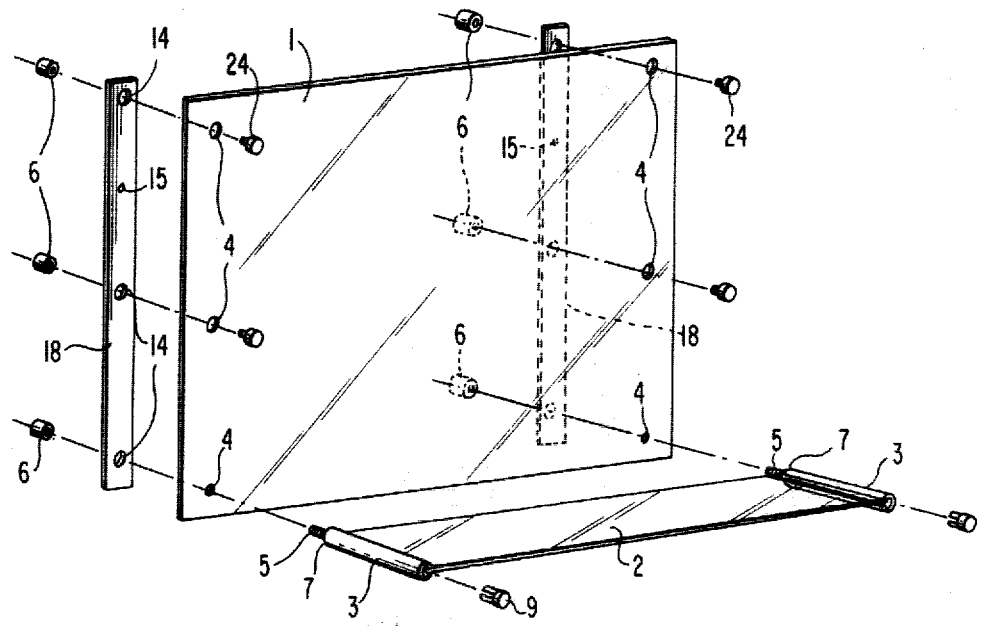
FIG. 1 shows an embodiment of a simple set of shelves according to the invention before it is put together in a perspective view, whereat the different parts of the set of shelves are apart.
Figure 2:
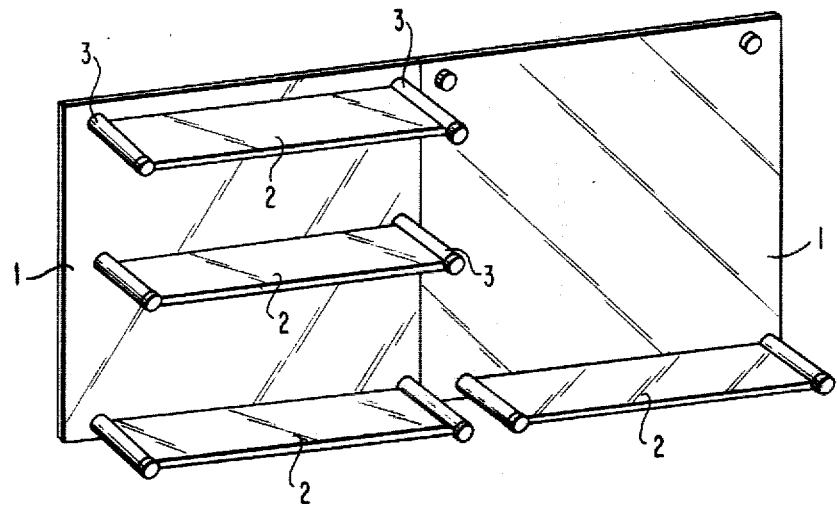
FIG. 2 shows one possible structure of the set of shelves, in which two rearplates have different numbers of shelves.
Figure 3:
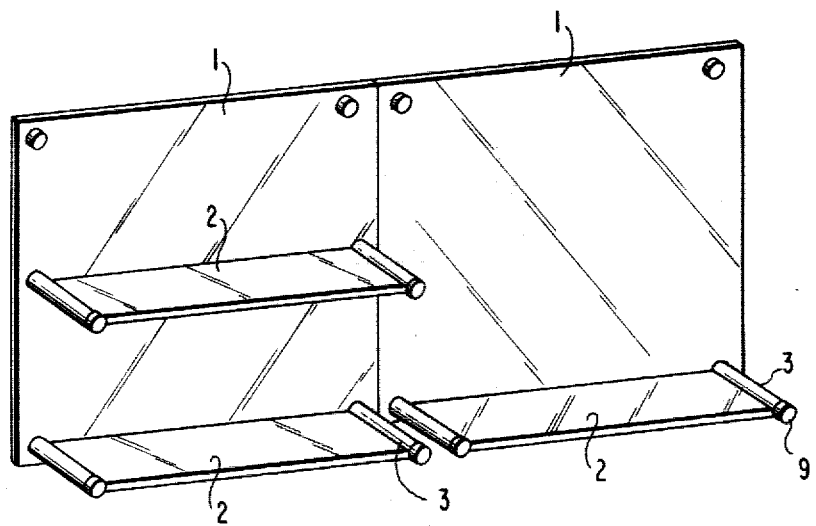
FIGS. 3-5 show some other possible structures of sets of shelves.
Figure 4:
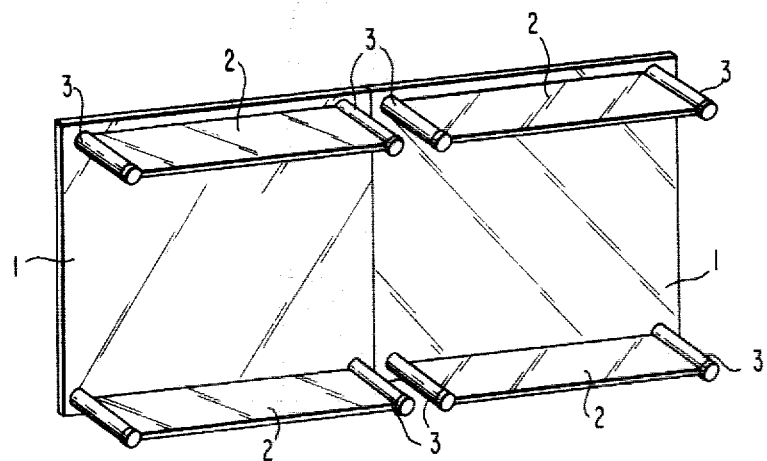
Figure 5:
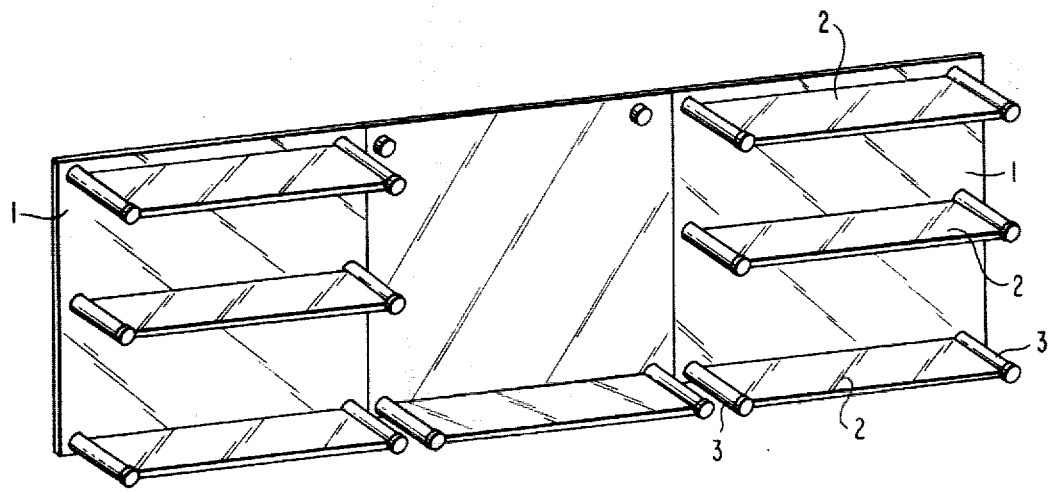
Figure 8:
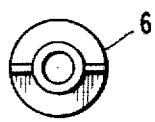
FIGS. 8 and 9 show the tightening nut for the supporting socket in two side views.
Figure 9:

FIG. 1 also shows the pair of preferably vertically hanging devices 18 for use with the set of shelves according to the invention. Hanging devices 18 are placed behind the rearplate 1 and are attached to it by means of the socket-formed supports 3 and/or by means of the plugs 16 and by means of the nuts 6. This nut 6 (FIGS. 8 and 9) is tightened at the end of the threaded tap 5, whereby the shoulder 7 of the support device 3 tightens against the surface of the rearplate thus attaching the support device 3 and the hanging device 8. For this purpose the hanging device has holes 14 which are so arranged such that their location corresponds to the location of the holes 4 in the rearplate 1.

Figure 10:
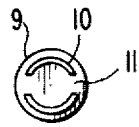
FIGS. 10 and 11 show the safety plug for the end of the supporting socket in two side views.
Figure 11:
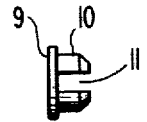

When both of the supports 3 and the hanging devices 18 (FIG. 1) are placed the shelf can be installed so that it firmly can take its place. The safety plug 9 (FIGS. 10 and 11) is pushed into the open end of the support 3. The purpose of these plugs 9 is to lock the shelf to its place. This can be done so that the end of the support and correspondingly the safety plug are so formed that the plug is locked to its place when it is pushed into the end of the support. The part 10 of the plug 9, which goes into the end of the support device 3, has a cut 11, whereat the edge of the shelf goes into the said cut.

One suitable construction of the hanging and supporting device 18 is shown in FIGS. 12 and 13. The hanging device is preferably a thin plate, the length of which corresponds to the height of the rearplate and whose edges 17 are bent to increase the stability. The bottom plate has preferably round platforms 20, 21, 22, which are placed symmetrically to the longitudinal axis of the hanging device and whose round upper surface is at the same level with the upper side of the edge 17. Platforms and edges support the rearplate 1 and simultaneously increase the stability of the hanging device, making it possible to use thinner mirror glass material as the rearplate of the set of shelves. The upper surfaces of the platforms has been made rough in order to get better attachement to the rearplate. Holes 14 have been arranged through the platforms 20 so that their vertical spacing corresponds to the spacing of holes 4 of the rearplate in the vertical direction. The tightening nuts 6 can go into the platforms 20, without projecting beyond the back surface of the hanging device. This is necessary when the set of shelves is attached to the wall. The platforms 21 have been arranged to support the rearplate and to increase the stability of the hanging device. By means of the hole 15 of the platform 22 it is possible to attach the set of shelves to the wall by means such as hooks (not shown), with the hooks attached to the wall such that their horizontal spacing corresponds to the horizontal spacing between the holes 15 of the pair of the hanging devices attached to the set of shelves. The size of the hooks can be such that they go into the platforms 22 fully, whereat the hanging device and simultaneously the whole set of shelves attaches firmly against the wall. If the set of shelves consist only of one shelf the hanging device 18 is attached to the rearplate in the middle and/or at its other end by means of the plug or plugs 24 and the nut or nuts 6.

The set of shelves according to the invention can easily be made so that the number of shelves varies as seen in the FIGS. 2-5. The set of shelves can have several rearplates like for instance in FIG. 5, in which there is three rearplates side by side. The middle one has only one shelf and the ones at its side three.

The structure according to the invention is suitable for set of shelves used in bathrooms or the like. Thus the rearplates can be made of rather thin mirror glass plate material and the shelves of bright glass plate. One or more of the rearplates can be mirrors. Holes for the supports can be made already in the factory. Unless all the holes aren't used in attaching the supports, these holes can be shut up by means of plastic or metal plugs.

The supports, the hanging devices, the nuts and the safety plugs according to the invention can preferably be made of plastic material or the like. This makes the manufacturing easy and cheap when large numbers of devices are manufactured. Plastic is also relatively elastic, whereat it doesn't cause any big tension to the glassplate, which tension could break the glass.

One advantage of the invention is the fact that a great variety of different set of shelves is accomplished, whereat the set of shelves can easily be rearranged to correspond the new needs. This is why this set of shelves can be used also in other places than in the bathrooms.

The dimensions of the set of shelves can naturally vary in the large scale, but it is naturally most advantageous to use standard dimensions.

The form of the supports can also vary. Their crosscut can be instead of round shape also angular quadratic possibly with round edges.

I claim:

1. A shelf assembly comprising:
a substantially rectangular-shaped rear plate having at least two spaced openings extending therethrough;
at least one pair of rod-shaped support devices, each having a first end portion extending through a separate opening in said rear plate, each rod-shaped support device including a hollow interior portion and a cleft portion extending outwardly from said interior portion through an exterior wall of said respective support device, with said rod-shaped support devices being positioned such that said respective cleft portions substantially confront one another;
a rigid shelf having an end portion extending into each cleft portion whereby said shelf extends outwardly from said rear plate; and
plug means mounted on each rod-shaped support device for preventing withdrawal of said shelf from said respective cleft portions.

2. A shelf assembly according to claim 1, wherein each of said rod-shaped support devices includes external threads formed on said respective first end portion, and each rod-shaped support device further includes a threaded nut mounted on said threaded end to prevent withdrawal of said threaded end through said rear plate opening.

3. A shelf assembly according to claim 1, wherein each plug means comprises a plug having a substantially cylindrical-shaped portion extending from a base portion into the hollow interior portion of a rod-shaped support device, said cylindrical-shaped portion including a pair of longitudinally extending slits spaced substantially 180° from one another about the circumference of said cylindrical-shaped portion,
each slit defining an opening substantially equal to a width of said shelf end portion, whereby opposite side walls of each slit slidingly contact said shelf end portion to prevent inadvertent withdrawal of said shelf end portion from said rod-shaped support devices.

4. A shelf assembly according to claim 3, wherein each cylindrical-shaped portion has an outer diameter substantially equal to an inner diameter of said hollow interior portion of said rod-shaped support device, creating frictional contact between said plug and said rod-shaped support device which prevents inadvertent withdrawal of said plug.

5. A shelf assembly according to claim 1, wherein a pair of substantially rectangular-shaped hanging supports are positioned adjacent said rear plate and on an opposite of said rear plate from said shelf,
each hanging support including at least one opening of sufficient size to allow the first end portion of a rod-shaped support device to pass therethrough.

6. A shelf assembly according to claim 5, wherein each hanging support extends substantially perpendicular to said shelf and includes a plurality of openings, each opening in one hanging support being aligned with an opening through said rear plate and a further opening in said remaining hanging support.

7. A shelf assembly according to claim 6, wherein a separate rod-shaped support device extends through each pair of aligned openings formed in said rear plate and adjacently disposed hanging support, forming vertically disposed pairs of horizontally-spaced rod-shaped support devices capable of supporting a plurality of vertically spaced rigid shelves.

8. A shelf assembly according to claim 5, wherein each hanging support includes a plurality of spaced, elevated platforms each contacting said rear plate, each hanging support further including a depression disposed between each pair of adjacently disposed platforms, each depression resting against a support surface.

9. A shelf assembly according to claim 8, wherein each hanging support includes bent edge portions extending into contact with said rear plate to provide further support for said rear plate.

10. A shelf assembly according to claim 8, wherein said rear plate is formed of glassplate and each elevated platform has a rough texture.

11. A shelf assembly according to claim 1, wherein said rear plate extends in a substantially vertical plane and said shelf extends in a substantially horizontal plane.

* * * * *